W. SCHAU.
TIRE TIGHTENER OR TIRE SETTER.
APPLICATION FILED AUG. 7, 1907.

948,638.

Patented Feb. 8, 1910.
5 SHEETS—SHEET 1.

Witnesses

Inventor
William Schau
By Chappell & Earl
Attorneys

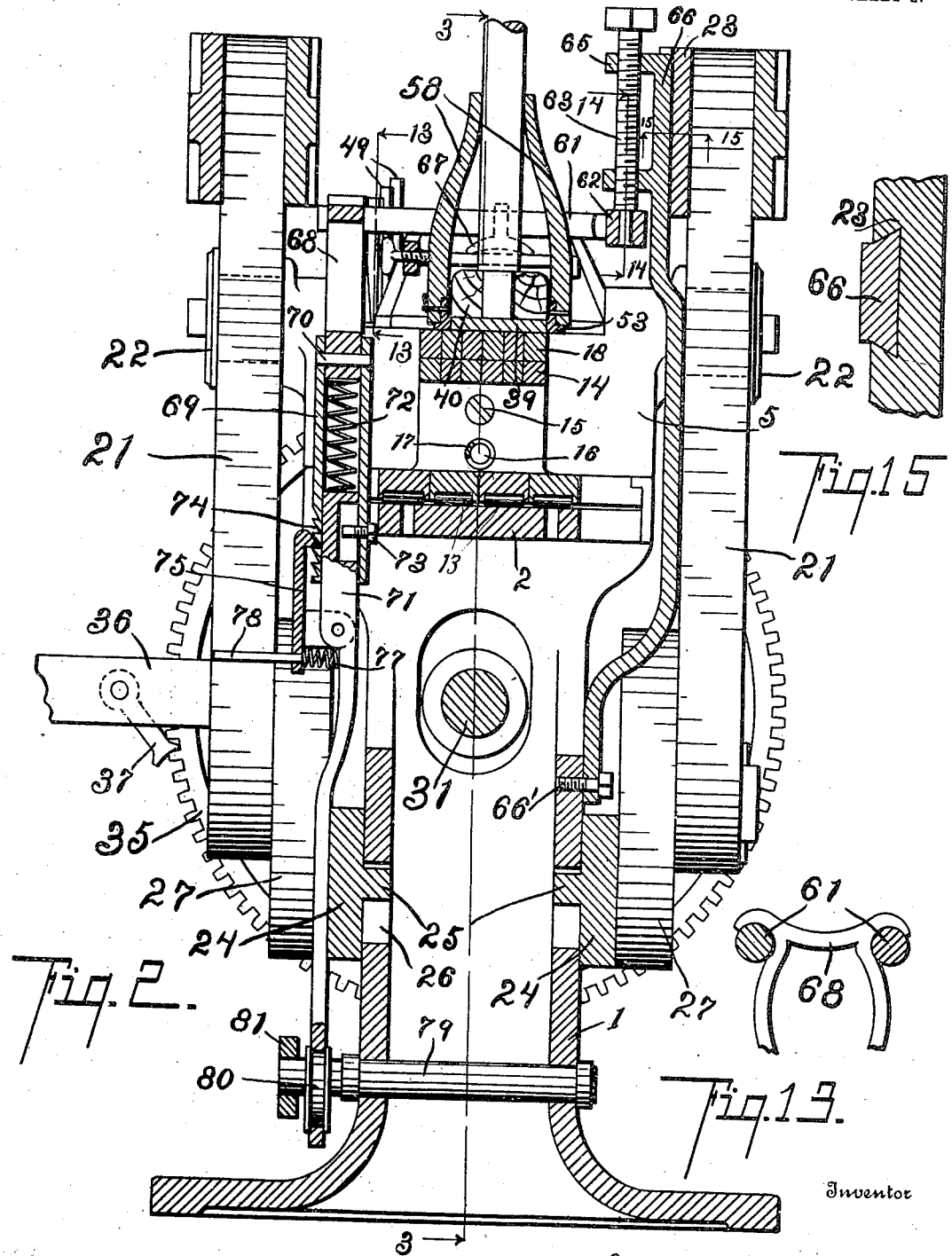

W. SCHAU.
TIRE TIGHTENER OR TIRE SETTER.
APPLICATION FILED AUG. 7, 1907.
948,638.
Patented Feb. 8, 1910.
5 SHEETS—SHEET 3.
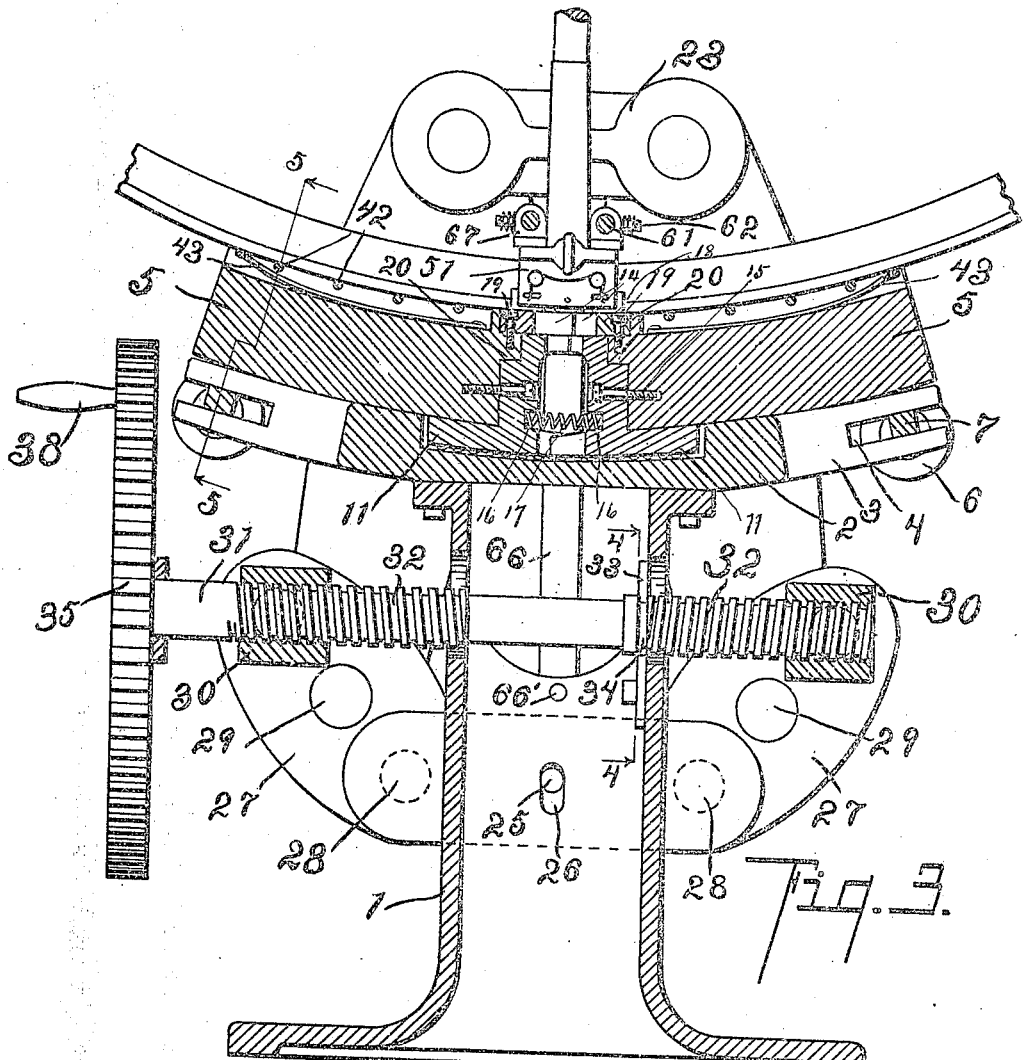
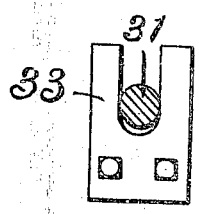
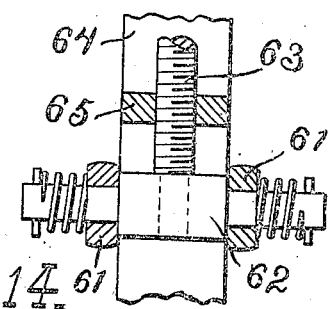
Witnesses
Inventor
William Schau
Chappell & Earl
Attorneys

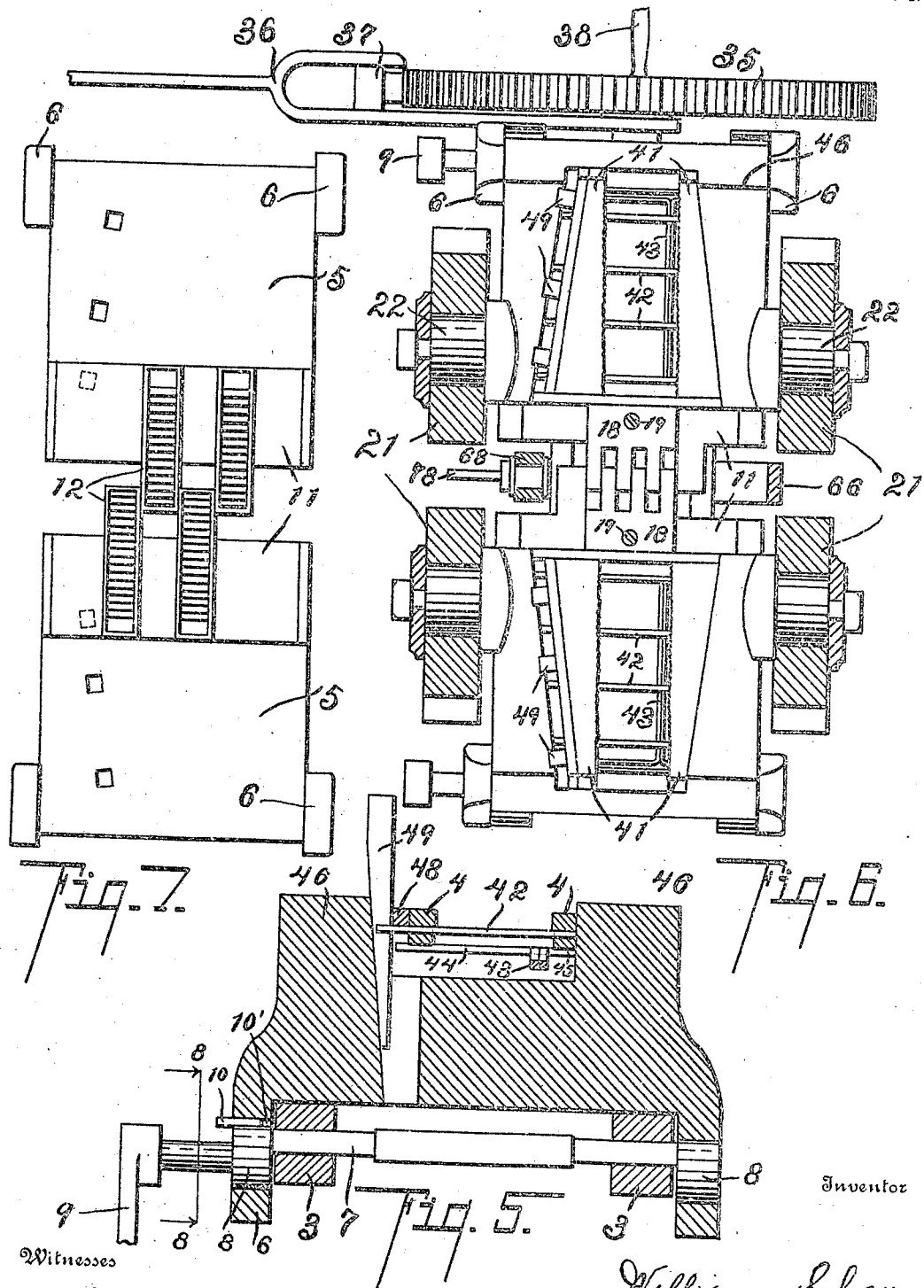

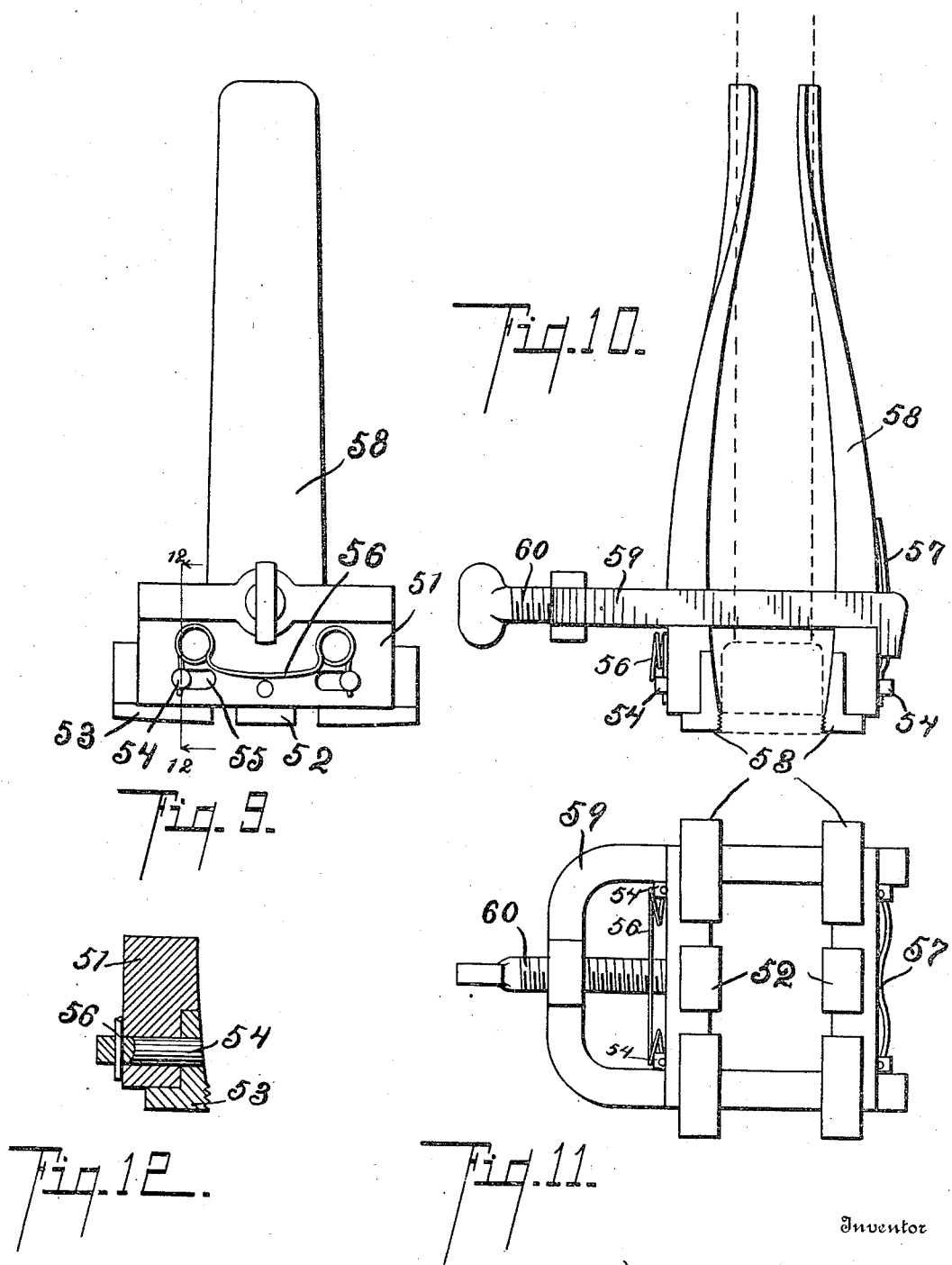

UNITED STATES PATENT OFFICE.

WILLIAM SCHAU, OF KALAMAZOO, MICHIGAN.

TIRE-TIGHTENER OR TIRE-SETTER.

948,638.     Specification of Letters Patent.     Patented Feb. 8, 1910.

Application filed August 7, 1907. Serial No. 387,460.

*To all whom it may concern:*

Be it known that I, WILLIAM SCHAU, a citizen of the United States, residing in the city and county of Kalamazoo, State of Michigan, have invented certain new and useful Improvements in Tire-Tighteners or Tire-Setters, of which the following is a specification.

This invention relates to improvements in tire setters, or tire tighteners.

It relates particularly to improvements in tire tighteners or tire setters such as are illustrated and described in my application for Letters Patent, filed October 15, 1906, Serial No. 339,088, and is a modification, and, in some respects, an improvement upon that structure, although certain features are adapted and desirable for use in other relations.

The main objects of this invention are: first, to provide an improved tire tightener or tire setter adapted for use in tightening or setting tires of vehicle wheels of practically all sizes; that is, it may be used for setting very heavy tires or light ones, although it is, on account of its great strength and power, especially designed for heavy work; second, to provide an improved tire tightener or tire setter by which the tire of a vehicle wheel may be tightened or set without removing the tire from the wheel; third, to provide an improved tire tightener or setter which is capable of very rapid manipulation, and also one which is easily operated; and fourth, to provide an improved tire tightener or setter which may be used for setting tires without removing the same from the wheels, and without injury to the felly or other parts of the wheel.

Further objects, and objects relating to details of construction, will definitely appear from the detailed description to follow.

I accomplish the objects of my invention by the devices and means described in the following specification.

The invention is clearly defined and pointed out in the claims.

Figure 1:
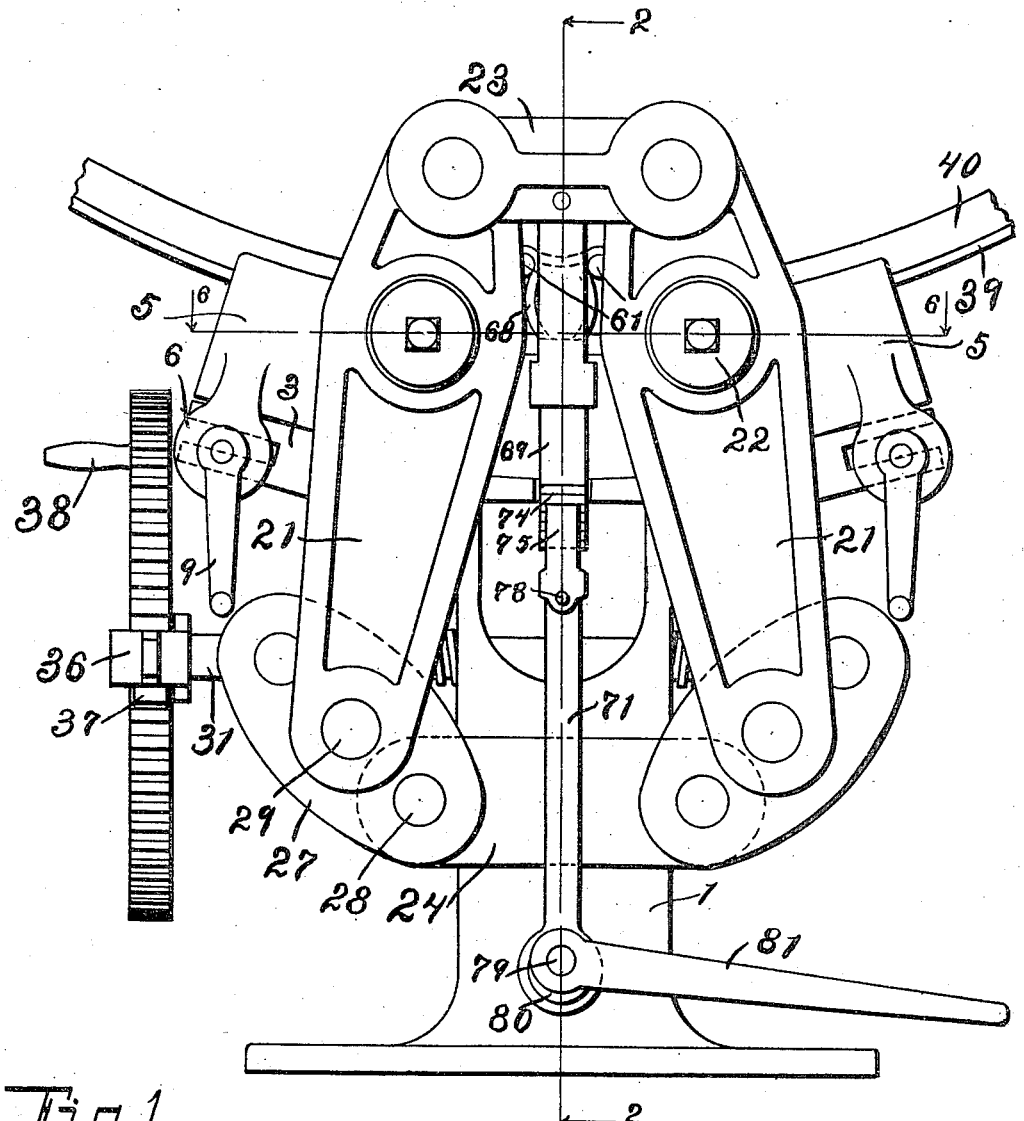
Figure 2:
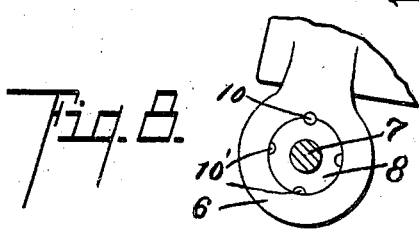

A structure embodying the features of my invention is clearly illustrated in the accompanying drawing, forming a part of this application, in which, Figure 1 is a side elevation of my improved tire tightener or tire setter, a section of the wheel rim or felly with a tire thereon being shown in position to illustrate the relation and function of the several parts; Fig. 2 is a vertical cross section, taken on a line corresponding to line 2—2 of Fig. 1; Fig. 3 is a vertical longitudinal section, taken on a line corresponding to line 3—3 of Fig. 2; Fig. 4 is a detail vertical section, taken on a line corresponding to line 4—4 of Fig. 3, showing means for retaining or securing the shaft 31 against longitudinal movement; Fig. 5 is an enlarged cross section taken on a line corresponding to the broken line 5—5 of Fig. 3; Fig. 6 is a plan view, parts being shown in horizontal section; Fig. 7 is an inverted plan of the wheel supporting plates 5 removed from the machine; Fig. 8 is a detail section, taken on a line corresponding to line 8—8 of Fig. 5, showing the supporting and adjusting means for the supporting plates; Fig. 9 is a side elevation of the wheel clamp; Fig. 10 is an end elevation thereof; Fig. 11 is an inverted plan thereof; Fig. 12 is an enlarged detail, taken on a line corresponding to line 12—12 of Fig. 9, showing the means for supporting one of the movable gripping jaws of the clamp; Fig. 13 is a detail vertical section, taken on a line corresponding to line 13—13 of Fig. 2, showing details of the clamp securing means; Fig. 14 is a detail vertical section taken on a line corresponding to line 14—14 of Fig. 2, showing further details of the clamp supporting means; and Fig. 15 is an enlarged detail, taken on a line corresponding to line 15—15 of Fig. 2.

In the drawing, the sectional views are taken looking in the direction of the little arrows at the ends of the section lines, and similar numerals of reference refer to similar parts throughout the several views.

Referring to the drawing, the frame or standard 1 of my improved tire tightener or tire setting machine is preferably of the form illustrated, although it is obvious that it may be greatly varied. On this standard 1 is a curved bed 2, on which the supporting plates 5 are mounted. The bed 2 is preferably bifurcated or provided with projecting arms 3 at each end. These arms are provided with longitudinal slots 4 opening at the outer ends thereof; see Fig. 3. The supporting plates 5 are slidably arranged on the bed 2, being arranged oppositely and adapted to be adjusted to and from each other.

The plates are preferably curved to fit the curved way of the bed, as clearly appears from the drawing. The plates 5 are preferably provided at their outer ends with downwardly-projecting ears 6, which embrace the arms 3 of the bed; see Fig. 5.

The rock shafts 7 are arranged in the longitudinal slots 4 on the arms 3 of the bed, so that, as the plates are moved in and out, the rock shafts move within the slots. The rock shafts are provided with eccentrics 8 arranged in the ears 6 of the supporting plates, so that, by adjusting the rock shafts, the outer ends of the plates are raised and lowered, the full advantage of which will more clearly appear as the description proceeds.

Suitable cranks, as 9, are provided for the rock shafts, the rock shafts being held in their adjusted position by means of the pins 10, a plurality of notches 10' being provided in the peripheries of the eccentrics, four notches being illustrated. Of course, these could be increased to secure the desired steps or degrees of adjustment.

The supporting plates are provided with bearing plates 11 at their inner ends, the bearing plates being somewhat L-shaped, as clearly appears from Fig. 3 of the drawing. These bearing plates are provided with roller bearings, the roller ways 12 being arranged to interlap, as clearly appears in Fig. 7, so that the rollers 13 are arranged in series. By this arrangement, the inner ends of the plates are continuously supported at the point of upsetting. These bearing plates extend upwardly at the ends of the supporting plates and are provided with interlapping portions 14. The supporting plates are loosely secured to the bearing plates by means of the screw 15, the screw holes in the bearing plates being of such size as to permit a rocking movement of the supporting plates relative thereto. The supporting and bearing plates are held normally separated by means of the coiled spring 17, the ends of which are arranged in suitable sockets or seats 16 provided therefor in each plate. The supporting plates are also provided with interlapping ends to provide a continuous support for the tire at the point of upsetting the same. This I preferably accomplish by securing the blocks 18 thereon, the blocks 18 being secured by means of the set screws 19, and further supported by the upwardly-projecting flanges 20 on the supporting plates. These blocks 18 are loosely mounted on the plates 5 so that they have a slight movement relative thereto, and the inner ends of the blocks rest upon the upper ends of the bearing plates.

To operate the supporting plates, I preferably provide levers 21, arranged in pairs, the levers being mounted on the journals 22 projecting from the plates. The upper ends of the levers on each side are connected by links 23.

On each side of the standard 1 is a vertically adjustable bar 24, the same being arranged longitudinally of the frame and provided with an inwardly-projecting stud 25, which engages the vertical slot 26 in the standard; see Figs. 2 and 3.

Levers 27, arranged in pairs are mounted on the pivots 28, carried by the bars 24. The levers 27 are connected by means of the pivots 29 to the lower ends of the levers 21. The levers 27 are also connected in pairs to the threaded nuts or blocks 30. The pivotal connection for the levers 21 and 27 is located between these blocks and their fulcrum pivots 28. These threaded blocks 30 are adapted to receive the screw shaft 31, which is provided with oppositely-threaded portions 32; that is, one end is provided with a right-hand screw and the other with a lefthand screw, so that the levers 27 may be drawn together or forced apart, according to the direction in which the shaft is revolved, and through the connection described, the supporting plates 5 are moved. The longitudinal movement of the shaft 31 is prevented by means of the slotted plate 33, which is arranged to engage the groove 34 on the shaft; see Figs. 3 and 4. On one end of the screw shaft is a gear wheel 35, which is adapted to be actuated by the lever and pawl 36 and 37, the lever 36 being forked at its inner end and mounted on the shaft, and the pawl 37 being arranged between the forks of the lever, as clearly appears from the drawing. The gear is also preferably provided with a crank or handle 38 by means of which the screw may be rapidly manipulated in setting or releasing the machine.

In upsetting the tire, it is secured to the supporting plates by means of the gripping jaws 41, the edges of which are serrated or toothed to engage the tire. These jaws are connected and held in alinement by means of the pins 42, a plurality of pins preferably being provided. The outer ends of the gripping jaws are held yieldingly upward by means of the springs 43 having laterally projecting arms 44 and 45 at the outer end of each, the gripping jaws resting on these arms. The supporting plates are provided with upwardly projecting converging ribs 46, which serve as supports for the gripping jaws and also serve to wedge the jaws upon the tire on the inward movement of the supporting plates. The jaws are preferably clamped upon the tire by means of the wedge pins 49. When they are to be clamped upon a narrow tire, filler bars, as 48, are made use of.

To effectively clamp the tire down upon the supporting plates at the point of upsetting and prevent buckling of the tire, I provide a clamp consisting of the member 51, having jaws 52 and 53 thereon, there being a pair of these members arranged oppositely. The jaws 52 are centrally arranged and are fixed, while the jaws 53 are secured so as to have a sliding or longitudinal movement, so that, as the tire is upset, they move inwardly toward the fixed jaws. To effectively support them, they are preferably L-shaped and arranged to project under the members and are provided with pins 54 which are arranged through the slots 55. The movable jaws are held normally in their outer position by means of the springs 56 and 57. The clamp members are adjusted by means of the screw 60, which is arranged through a suitable clamping yoke 59. This clamp is placed upon the tire before the wheel is placed in the machine, so that it can be easily placed in any desired position, and the jaws nicely adjusted to engage the tire, so that the felly is not likely to be marred or bruised. The clamp members are provided with upwardly projecting arms 58 which may be engaged on a spoke of the wheel to assist in supporting the wheel in an upright position.

In setting a tire, the clamp described is first placed upon the wheel, and the wheel placed in the machine upon the supporting plates. The clamp is then drawn down to draw the tire firmly down upon the supporting plates, preferably by means of the rods 61 which are pivotally mounted on the cross piece 62, carried by the threaded rod 63. This rod 63 is vertically arranged through the laterally projecting arms 65 on the bar 66. This bar is secured at its lower end by the screw 66' to the frame and at its upper end it is secured to one of the links 23, a dove-tail connection being provided, so that the link has a slight up and down movement relative thereto. The rods 61 are provided with rests 67 adapted to engage the side pieces of the adjusting yoke of the clamp, so that, when the rods are drawn downwardly, the clamp is forced downwardly. I preferably accomplish this by means of an adjustable link consisting of the head 68, which is adapted to engage the rods, and a hollow section 69 to which the head is pivoted, so that it has a lateral movement.

The link section 69 is adapted to receive the upper end of the section 71, the movement of the section in the head being limited by means of the set screw 73. The head is held normally upward by means of the spring 72, arranged in the hollow section of the link. The sections 71 and 69 are adjustably connected by means of the pawl 75 which is adapted to engage the rack 74 provided therefor on the section 69. The pawl is held yieldingly in engagement by means of the spring 77, and may be released by means of the projecting finger piece 78. In use, the link is lengthened sufficiently, so that the rods 61 may be readily engaged with the head thereof and is then shoved down as far as convenient by pressing on the upper end thereof, which telescopes the sections, the pawl holding them in their adjusted position. The link is then actuated by means of the eccentric 80, which engages the lower end thereof to draw down the clamp firmly into position. The eccentric is mounted on the rock shaft 79, which is operated by a suitable lever, as 81. By this securing mechanism, which may be adjusted to meet any requirements in the matter of thickness or width of the tire, the tire is firmly clamped down on the supporting plates, so that in upsetting the same buckling or kinking is prevented. As previously stated, I secure a mechanism which is capable of very rapid manipulation, and the tire is effectively upset without buckling the same and without injuring or marring the felly.

I have illustrated and described my improved tire tightening or setting machine in detail in the form preferred by me on account of its structural economy and strength and convenience in operation. I am, however, aware that it is capable of considerable variation in structural details without departing from my invention, and I desire to be understood as claiming the same specifically, as well as broadly.

Having thus described my invention, what I claim as new and desire to secure by Letters Patent is:

1. In a structure of the class described, the combination with a pair of supporting plates mounted to be adjusted to and from each other, of tire gripping jaws carried by said plates whereby a tire is secured thereto to be upset by the closing movement of said plates; a clamp for securing a tire upon said supporting plates, comprising a pair of clamping members having upwardly-projecting arms thereon adapted to engage a spoke of a wheel, tire gripping jaws for said clamping members, a clamping yoke for said clamping members, and an adjustable screw for said clamping yoke; and means for actuating said clamp to draw it downward to clamp the tire upon said supporting plates, for the purpose specified.

2. In a structure of the class described, the combination with a pair of supporting plates mounted to be adjusted to and from each other, of tire gripping jaws carried by said plates whereby a tire is secured thereto to be upset by the closing movement of said plates; a clamp for securing a tire upon said supporting plates, comprising a pair of clamping members having tire gripping jaws for said clamping members, a clamping yoke for said clamping members and an adjustable screw for said clamping yoke; and means for actuating said clamp to draw it downward to clamp the tire upon said supporting plates, for the purpose specified.

3. In a structure of the class described, the combination with a pair of supporting plates mounted to be adjusted to and from each other, of tire gripping jaws carried by said plates whereby a tire is secured thereto to be upset by the closing movement of said plates; a clamp for securing a tire upon said supporting plates, comprising a pair of clamping members having upwardly-projecting arms thereon adapted to engage a spoke of a wheel, tire gripping jaws mounted on said clamping members, each clamping member being provided with a central fixed jaw and a laterally yielding jaw at each side of the fixed jaw, said yielding jaws being adapted to close up to said fixed jaw during the closing movement of said plates, adjusting means for said clamp members; and means for actuating said clamp to draw it downward to clamp the tire upon said supporting plates, for the purpose specified.

4. In a structure of the class described, the combination with the tire supporting plates, of a tire clamp; means for actuating said clamp; a vertically-arranged adjusting member; a cross-piece carried thereby; a pair of rods pivoted on said cross-piece; a pair of clamp engaging members pivotally mounted on said rods; and means for securing said rods and drawing said clamp downward to clamp the tire upon said supporting plates.

5. In a structure of the class described, the combination with the tire supporting plates, of a tire clamp having spoke engaging arms; means for drawing said clamp downward to clamp the tire upon said supporting plates, consisting of a vertically-adjustable member, a cross-piece carried thereby, a pair of rods pivotally mounted on said cross piece adapted to be swung over said clamp at each side of said spoke engaging arms thereof, and means for applying stress to the swinging ends of said rods, for the purpose specified.

6. In a structure of the class described, the combination of a pair of tire supporting plates mounted to be adjusted to and from each other; tire gripping jaws carried thereby; a clamp having tire gripping jaws and spoke engaging arms thereon; and means for drawing said clamp downward to clamp the tire upon said supporting plates, for the purpose specified.

7. In a structure of the class described, the combination of a tire clamp; securing means for said clamp comprising a clamp engaging member; a support on which said member is pivotally mounted; an adjusting screw for said support, and means for applying stress to the swinging end of said clamp engaging member, for the purpose specified.

In witness whereof, I have hereunto set my hand and seal in the presence of two witnesses.

WILLIAM SCHAU. [L. S.]

Witnesses:
OTIS A. EARL,
LULU GREENFIELD.